Figure 4:
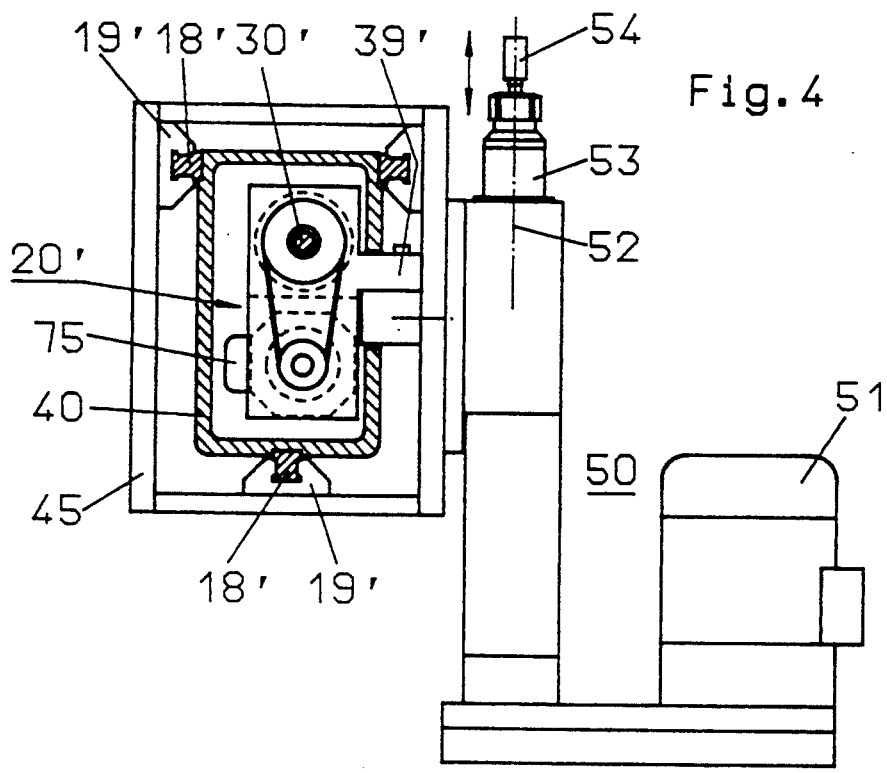

United States Patent [19]

Beer

[11] Patent Number: 5,238,339
[45] Date of Patent: Aug. 24, 1993

[54] MACHINE TOOL FOR WORKING FLAT WORKPIECES

[76] Inventor: Alfred Beer, Langackerstrasse 33, CH-6330 Cham, Switzerland

[21] Appl. No.: 748,282

[22] Filed: Aug. 21, 1991

[30] Foreign Application Priority Data

Aug. 28, 1990 [CH] Switzerland ............... 02791/90

[51] Int. Cl.⁵ ............................................. B23C 1/06
[52] U.S. Cl. ............................ 409/191; 144/134 A; 409/202; 409/212
[58] Field of Search ............ 409/224, 202, 211, 212, 409/189, 190, 191; 83/953; 408/3; 27/26 R, 26 A; 74/89.15; 144/134 A, 134 D, 136 C

[56] References Cited

U.S. PATENT DOCUMENTS

| | | | |
|---|---|---|---|
| 4,468,160 | 8/1984 | Campbell, Jr. | 409/202 |
| 4,557,156 | 12/1985 | Teramachi | 74/89.15 X |
| 4,705,438 | 11/1987 | Zimmermann et al. | 409/224 X |
| 4,818,160 | 4/1989 | Rabe et al. | 409/202 |

*Primary Examiner*—Z. R. Bilinsky

[57] ABSTRACT

The generally vertical, rectangular base frame (10) of the machine surrounds a support grate (14) with attachment members for the flat work pieces (8). A carrier (40) is moveable along two oppositely disposed frame sides (12) over the support grate, and a carriage (45) is moveable on the carrier (40), the carriage (45) carrying a work mechanism (50) equipped with at least one work tool spindle with its work tool axis directed toward the support grate (14). Feeding or positioning of the work mechanism (50) is accomplished by means of fixed and non-rotatably attached finely threaded feed spindles and associated rotatably drivable spindle nuts. The spindle nuts are each part of an associated feed device with a numerically controlled feed motor. Each of the feed spindles is attached to an associated one of the two frame sides (12) and the associated feed device is connected with one end of the carrier (40) through a bracket (42), the involved feed motors being synchronously controlled. A third feed spindle is attached to the carrier (40) and the associated feed device is connected with the carrier (45), the spindle and the feed device being located inside of the hollow profile of the carrier. The machine offers numerous and exact machining applications, especially milling and drilling operations.

12 Claims, 3 Drawing Sheets

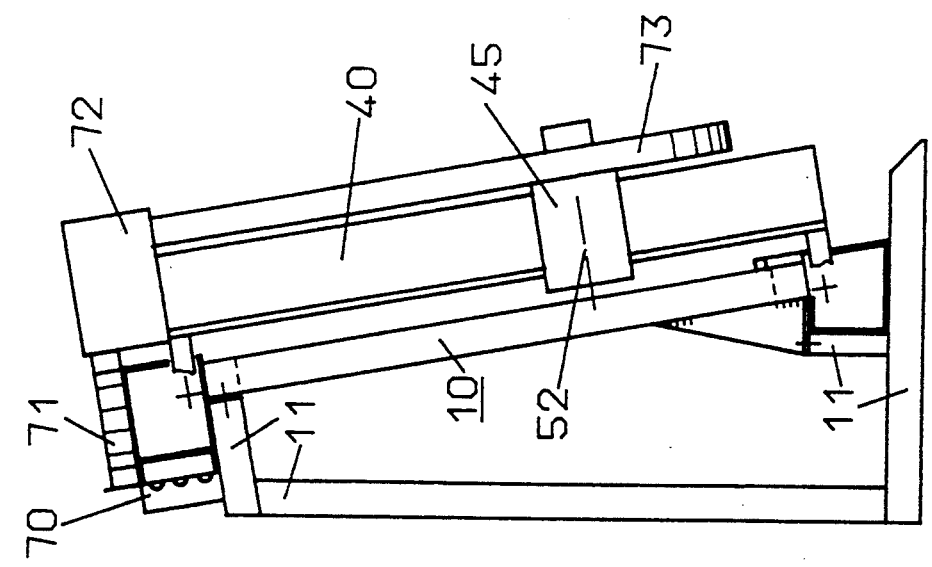
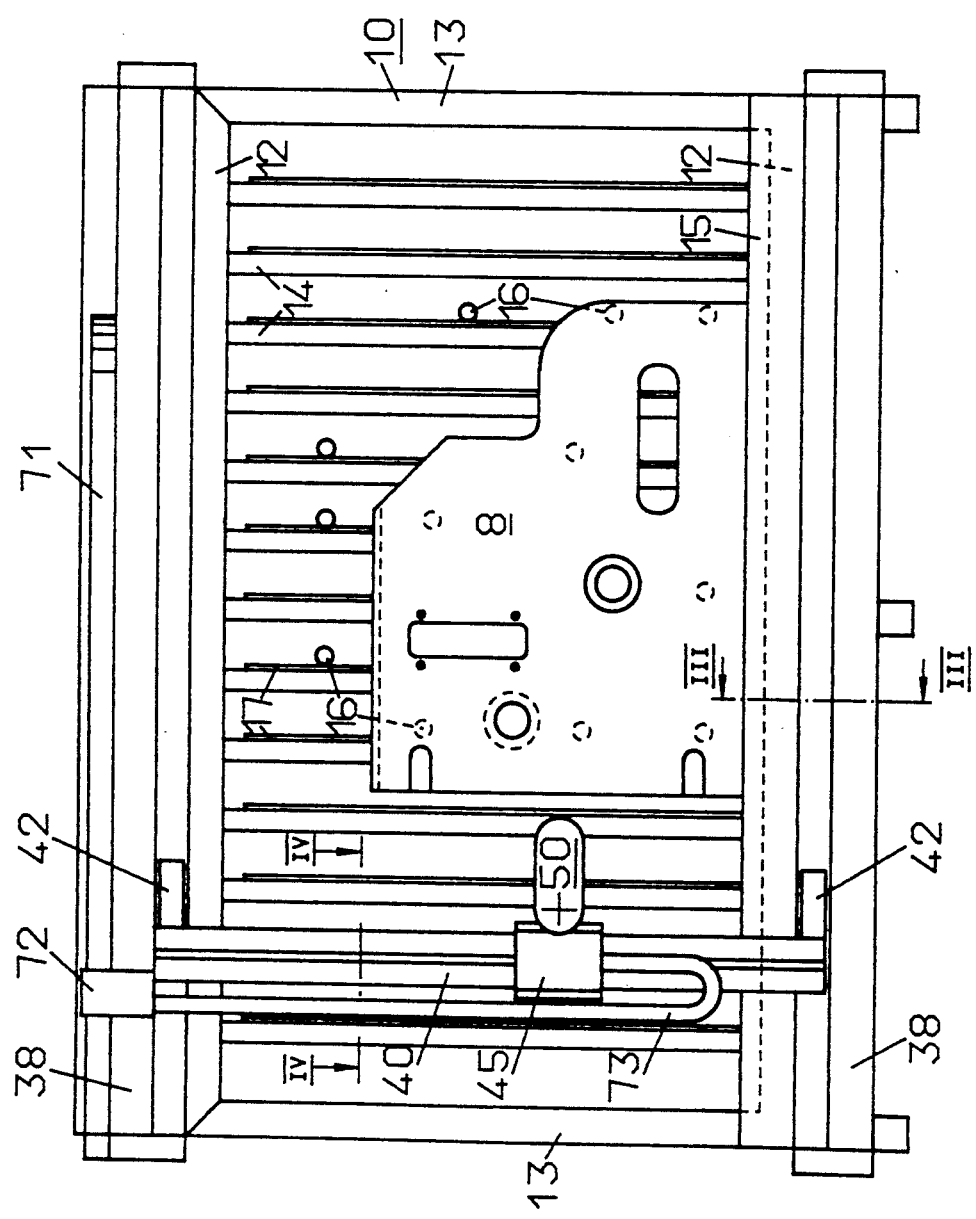

MACHINE TOOL FOR WORKING FLAT WORKPIECES

The invention concerns a machine tool for working flat work pieces, with a generally vertical, rectangular base frame surrounding a support grate for the work pieces, a carrier, guided on two opposite frame sides and moveable along them over the support grate, and a work mechanism containing a work tool spindle and guided on the carrier and moveable along it.

Machines of this type are known in the form of so-called slab saws for cutting slabs from wood or other wood-like material. They include as a work mechanism a circular saw apparatus with a spindle parallel to the plane of the support grate, which apparatus is pivotal 90° to selectively carry out either horizontal or vertical cuts. The use of such slab saws is limited to the cutting or trimming of rectangular slabs by means of circular saw blades. The feed of the saw apparatus takes place by hand, and in the vertical direction most such apparatuses are assisted by counterweights or spring arrangements.

The object of the present invention is the provision of a machine tool especially for flat work pieces, which machine permits the expedient carrying out of numerous and precise work procedures on work pieces of practically any desired material. Proceeding from the basic construction mentioned above a machine tool achieves this object in that a finely threaded feed spindle is fixedly and non-rotatably attached to each of the two mentioned opposite frame sides and to the carrier, and that each of these three feed spindles has associated with it a rotatably drivable spindle nut which in the related feed device is connected to a numerically controlled feed motor, with two of the feed devices having their feed motors synchronously controlled, each of which is located at an associated end of the carrier, and with the third feed device being mounted on a carriage guided on the carrier, which carriage carries the work mechanism with a work tool axis directed toward the support grate.

With such a machine tool the known advantages of slab saws, especially the convenient work piece handling (loading and unloading of the machine) are maintained, yet the applications of the tool are increased to an unexpected degree: the construction of the invention permits the precise and rapid positioning of the work tool and the desired straight or curved line feeding movement over an expansive work surface. Thereby each milling and drilling operation on flat work pieces, especially of plastic, metal or laminate material (sandwich or honeycomb panels), can be carried out without problem with high quality of finish and can be program controlled. General advantages are good inspectability and easy accessibility in the operation of the machine and in the exchange of work tools, unhindered chip discharge and minimal bending in the working plane of even large surfaced work pieces.

Especially advantageous refinements of the invention defined by claim 1 are given in claims 2 to 11.

Figure 3:
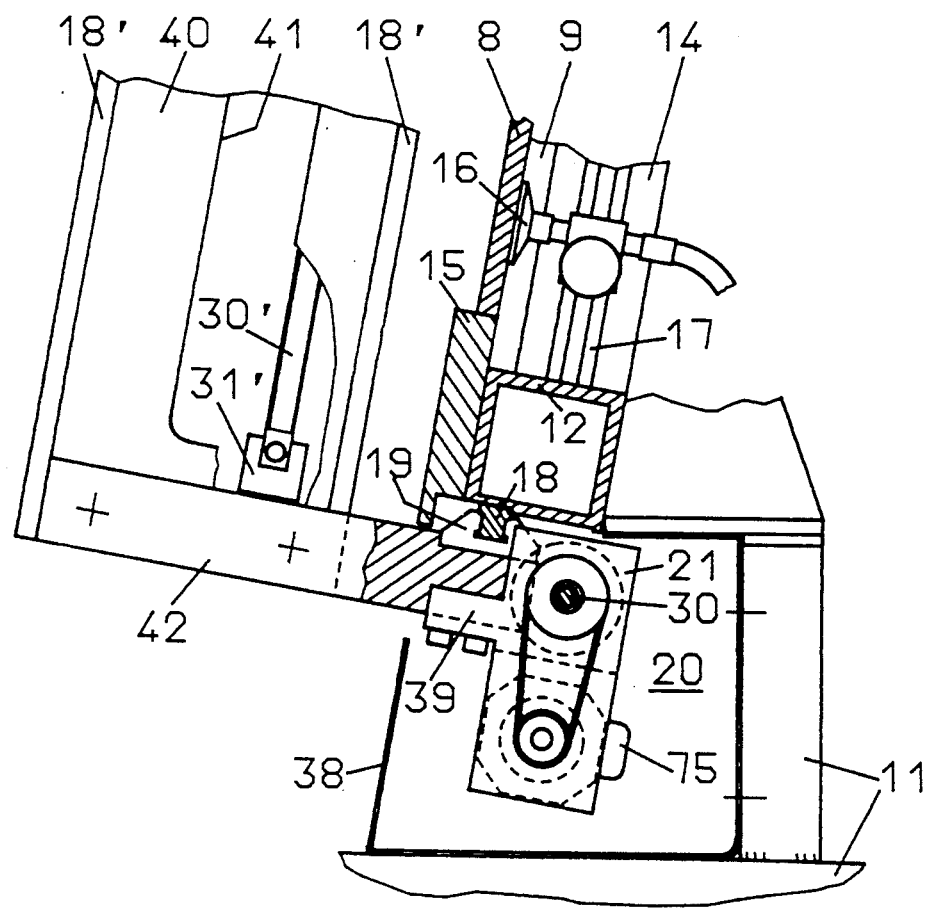
Figure 6:
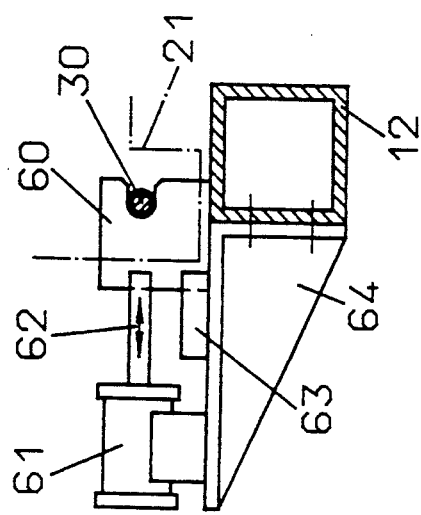
Figure 5:
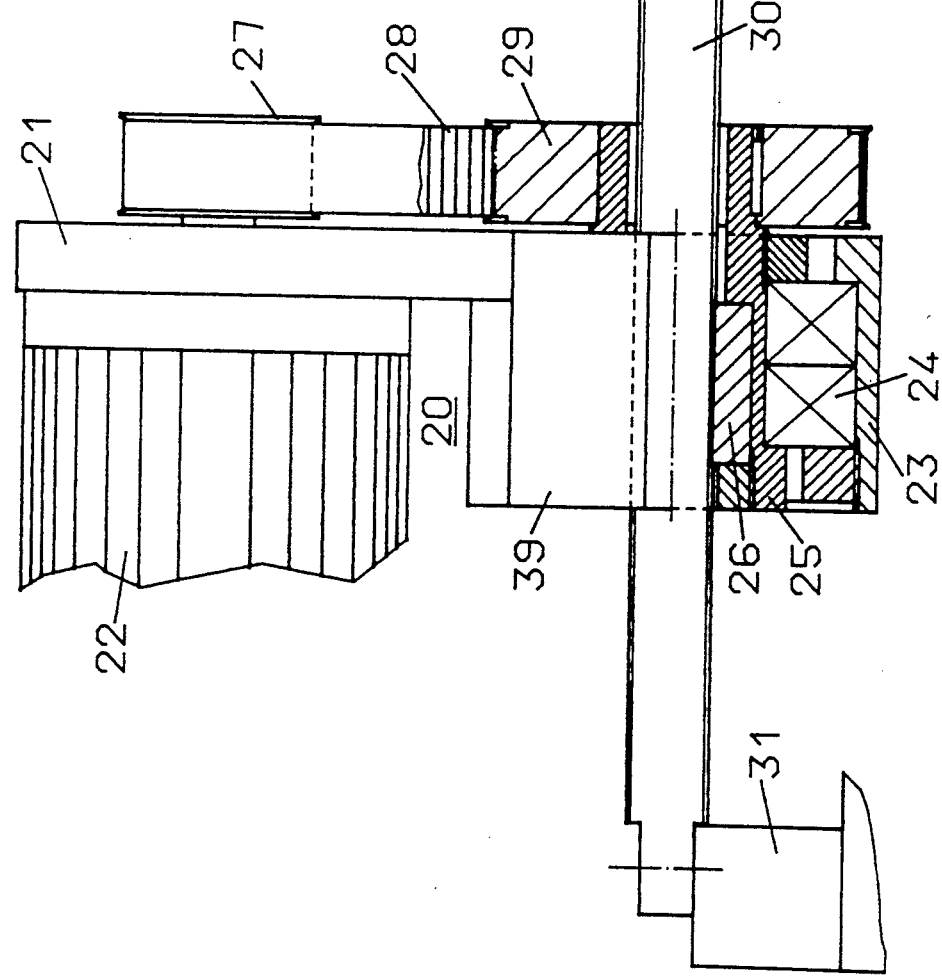

An exemplary embodiment of a machine tool made in accordance with the invention is explained in more detail hereinafter in association with the drawings. The drawings show:

FIG. 1—A front view of the machine tool.
FIG. 2—A side view of the machine tool.
FIG. 3—A sectional view taken on the line III—III of FIG. 1.
FIG. 4—A sectional view taken on the line IV—IV of FIG. 1.
FIG. 5—A schematic view of the anchoring and attachment of the upper, horizontal feed spindle with its associated feed device shown partially in section.
FIG. 6—A view showing an example of an (optional) intermediate brace for one of the feed spindles.

The illustrated machine tool has a rectangular base frame 10 made of parallel pairs of frame sides 12 and 13, with the longer frame sides 12 running horizontally. The base frame 10 is bolted to a machine stand 11 in a generally vertical position—preferably slightly leaning toward the rear. A support grate is provided inside of the frame 10 for receiving flat work pieces 8 and is made of support strips 14 arranged parallel to one another and connected to the two longer frame sides 12. Each support strip 14 on the side facing the work piece is provided with a replaceable bearing strip 9 (FIG. 3) preferably made of plastic. The bearing strips 9 together form a precisely prepared, planar support surface for the work piece 8. A continuous strip 15 is fastened to the forward side of the lower frame side 12, which strip 15 serves as an abutment for the lower edge of the work piece 8. As can be seen from FIGS. 1 and 3, a plurality of suction cups 16 (vacuum-suckers) are provided for gripping the work piece, which suction cups are slidable along a grooved rail 17 applied laterally to the support strips 14. By means of several such vacuum cups 16, gripping the work piece on its rear side and connected to a (non-illustrated) source of vacuum pressure, the work piece 8 is held against the support surface of the support grate.

A carrier 40 is guided on two of the frame sides lying opposite to one another and is moveable along them over the support grate 14. Preferably, as in the illustrated case, the carrier 40 is arranged in the vertical direction and is guided by the two longer horizontally extending frame sides 12. A carriage 40 is then guided on the carrier 40 and is moveable along its length. The carriage 45 carries a work mechanism 50, having at least one work tool spindle 53 with a work tool axis 52 directed toward the support grate 14. For guiding the carriage 40 along the frame sides 12 (X-direction) a guide rail 18 is fastened to the lower side of the lower frame side 12 and a similar guide rail is located at the upper side of the upper frame side 12 (not visible). On each of its ends the carrier 14 has a bracket 42 extending laterally toward the base frame 10. At least one guide unit 19 is fastened to each bracket, which guide unit engages the corresponding guide rail 18. Preferably two guide units are arranged on each bracket 42 and are displaced from one another in the direction of the guide rail 18. The carriage 45 is also guided in a corresponding manner for movement along (Y-direction) the carrier 40. As shown in FIG. 4 three guide rails 18' are fastened to the outer side of the carrier 40 which is formed as a four edged hollow profile. The carriage 45 is formed like a box and surrounds the profile of the carrier 40. Three guide units 19' are fastened to the inner side of the carriage 45 and stand in engagement with the guide rails 18'. Through the use of roller guides 19,19' which are known in themselves, and ground guide rails 18,18' a precise, free of play and easy action guiding in the X and Y directions is guaranteed.

The positioning movements of the carrier 40 and of the carriage 45 for positioning and path guiding the work tool axis (axes), as well as possible movement of the work tool spindle (spindles) 53 in the direction of the work tool axis (Z-direction) are numerically controlled. For this a so-called 2,5-axis, programmable microprocessor control can be used which is in itself known and is not here illustrated and described in further detail. The numerically controlled positioning means of the machine tool for the X and Y directions are formed as follows.

To each of the two frame sides 12 lying opposite to one another a finely threaded feed spindle 30 is rigidly and non-rotatably attached. The upper spindle 30 is illustrated in FIG. 5 and the lower similar spindle is visible in section in FIG. 3. A similar feed spindle 30' is in like manner fixed to the carrier 40, and is preferably located inside of its hollow profile as evident from FIGS. 3 and 4. Advantageously, the feed spindles 30,30' are fastened with pre-stress in the longitudinal direction; for example, by means of an arrangement according to FIG. 5 whereby one spindle end is rigidly bolted to a rigid bracket 31 (or 31', FIG. 3), while the other end of the spindle is bolted to a slide 33 which is guided on a second rigid bracket 32 and can be shifted by a tensioning screw 34 to set the spindle to a desired amount of tension.

Each feed spindle 30,30' has associated with it a spindle nut 26 (FIG. 5) which is a component of a moveable feed device 20,20' with a numerically controlled feed motor 22. All three feed devices are built essentially similarly. The devices 20 are utilized with each having its associated spindle 30 in a lower or upper channel-type casing 38, while the feed device 20' is located with the spindle 30' inside of the carrier 40. An advantageous construction of the feed devices is illustrated in FIG. 5. In a housing 23 extending from a base plate 21 a hollow shaft 25 is supported by means of ball bearings 24. The spindle nut 26 is fastened inside of the hollow shaft 25 by means of a clamping ring. The numerically controlled feed motor 22 is mounted on the base plate 21 next to the housing 23. Its shaft drives the hollow shaft 25 over a toothed belt 28 running over belt pulleys 27,29, preferably with speed reduction. Thus, the numerically controlled rotary motion of the motor is transferred to the spindle nut 26 which correspondingly shifts in the feed direction along the threads of the feed spindle. The feed motors 22 of the two feed devices 20 (for the X direction) are synchronously controlled so that similar positioning movements along the upper and the lower feed spindles 30 are always assured. A lateral ear 39, which extends from the base plate 21 and the housing 23, serves for the transmission of the positioning movement of the feed devices 20 and 20'. The upper and the lower brackets 42 of the carrier 40 are each bolted to the associated one of these ears 39 of the upper and lower feed devices 20. The ear 39' of the feed device 20' on the other hand extends through the longitudinal slot 41 of the carrier and is bolted to the carriage 45.

The described construction with fixed and non-rotatable feed spindles, and feed devices moveable thereon with rotatably driven spindle nuts, permits precise feed and positioning movements at relatively high speeds over large ranges of adjustment and over expansive working surfaces. Thanks to the "static" feed spindles no difficulties arise with respect to bearing play and critical rotational speed, as exist with rotating spindles. On the other hand, because of the low pitch of the spindle thread a relatively high rotary speed of the feed motor occurs at a given positioning speed. This results in motors with small dimensions and small moments of inertia, and therefore in relatively low weight and small inertia for the entire feed device. Moreover, with low thread pitch and with rotary speed reduction between the motor shaft and the spindle nut high feed forces, such as are required in milling, are achieved with relatively low performance of the feed motors. Especially suitable are precision roller spindles with so-called satellite spindle nuts which are known by the tradename ROLLVIS.

In the case of machines of large dimension the bending of the horizontal feed spindles as a result of their own weight (despite pre-stressing) can have a detrimental effect on the positioning accuracy, above all in the end areas of the positioning path. Therefore, one or more intermediate braces can be provided, generally according to the example of FIG. 6 for the upper feed spindle 30. The main component of one such intermediate brace is for example a plate shaped brace member 60 which engages the spindle 30 and abuts the frame side 12 and/or an adjacent brackle 64 and which slides in a side guide 63. The brace member 60 is connected with a suitable reciprocating drive, for example a pneumatic cylinder 61 through the reciprocating rod 62. With the help of the reciprocating drive the brace member 60 can be moved out of the movement zone of the associated feed device (the periphery of the base plate 21 being illustrated in FIG. 6 by dash - dot lines). The moving out and moving back of the support member 60 occurs automatically in dependence on the position of the feed device 20. This automatic movement of the support member can be easily accomplished by means of the numeric control upon the feed device approaching the position of the intermediate brace.

The feed devices 20 and 20' are provided with junction boxes 75 for feeding the feed motors as well as the position encoders for the control of the feed motors and for the synchronization of the upper and lower feed devices. For the feed and control conductors a junction box 70 (FIG. 2) is provided on the machine. From there the conductors run through a flexible cable guide 71 to an intermediate box 72 fastened to the carrier 40 and from there through the carrier to the upper and lower feed devices 20. A further flexible cable guide 73 leads from the intermediate box 72 to the carriage 45 and to the feed device 20', and to the work mechanism 50.

A simple example of a work apparatus 50 is illustrated in FIG. 4. Its drive motor 51 drives the work spindle 53 with the work tool 54, for example a mill or drill. It is of course understood that several spindles can be provided as well as additional devices for work tool exchanges, cooling medium delivery and the like. In general the work tool spindle or spindles 53 is or are moveable in the direction of the work tool axis or axes 52 (Z-direction). The work tool axis is generally directed toward the support grate and indeed is generally perpendicular to the plane of the support grate, although the possibility of an inclined position for certain work operations is not to be excluded.

The described machine tool offers extraordinarily abundant possibilities for working flat or plate shaped work pieces, of which several possibilities are indicated on the work piece 8 in FIG. 1: manufacture of desired peripheral shapes by means of path control, lateral cut-ins, grooving and beveling of the work piece edges; manufacture of cut-outs of desired shape, bores, countersinking of bores from the forward or rear side, thread tapping, cutting straight and curved grooves in the upper surface, engraving; press fitting and threading in of bolts and the like.

To the side of the driven carrier 40 the machine can be loaded with work pieces from the front or from above, but above all work pieces can also be inserted from the side and pushed further on the abutment strip 15 and at the end of their working can finally be pushed out of the machine. If need be several, especially thin sheet-like work pieces can be stacked on one another and can be worked "packetwise".

I claim:

1. A machine tool for working flat work pieces comprising:
    a generally vertical, rectangular base frame having two frame sides located opposite to one another at opposite sides of the base frame;
    a support grate substantially surrounded by the base frame;
    a carrier guided on the two frame sides and which is moveable along the two frame sides and over the support grate;
    a carriage guided for movement on the carrier, the carriage carrying a work mechanism, the work mechanism including a work tool spindle and having a work tool axis directed toward the support grate;
    first and second finely threaded feed spindles rigidly and non-rotatably fastened to respective ones of the two frame sides; and
    a third finely threaded feed spindle rigidly and non-rotatably fastened to the carrier;
    wherein each of the first, second, and third feed spindles is associated respectively with a first, second and third feed device, each of the feed devices including a rotatably drivable spindle nut engaged with the associated feed spindle and a numerically controlled feed motor rotatably driving the spindle nut for moving the spindle nut along the associated feed spindle, the first and second fee devices being located at oppositely disposed ends of the carrier and having their associated feed motors synchronously controlled, and the third feed device being mounted on the carriage.

2. A machine tool according to claim 1, wherein the feed spindles are fastened to the two frame sides or the carrier with longitudinal pre-stress.

3. A machine tool according to claim 1, further comprising a hollow shaft receiving one of the spindle nuts and being rotatably supported in a housing of one of the feed devices with the hollow shaft being drivable by feed motor associated with the spindle nut through a rotational speed reduction drive.

4. A machine tool according to claim 1, further comprising one or more moveable support members associated with the feed spindles, which support members are automatically moveable out of movement zones of the associated feed devices in dependence on the positions of said feed devices.

5. A machine tool according to claim 1, wherein the carrier has a hollow profile with a longitudinal slot, with the feed spindle and the associated feed device being arranged within the hollow profile.

6. A machine tool according to claim 5, wherein the carriage carrying the work mechanism is connected with its feed device through the longitudinal slot, with the carriage being arranged as a box around the hollow profile of the carrier and being guided by means of guide rails fixed to the carrier.

7. A machine tool according to claim 1, wherein the carrier has oppositely disposed ends has a bracket extending laterally toward the base frame, which bracket is connected with one of the feed devices and with at least one guide unit, with the guide units each being guided by a guide rail fastened to a respective one of said frame sides.

8. A machine tool according to claim 1, wherein the work tool spindle of the work mechanism is adjustable in the direction of the work tool axis.

9. A machine tool according to claim 1, wherein the two frame sides extend horizontally at upper and lower sides of the generally vertical, rectangular base frame, and the carrier is arranged in a vertical direction and is guided at upper and lower ends by the two horizontally extending frame sides.

10. A machine tool according to claim 1, wherein the support grate is formed by support strips connected between the two frame sides.

11. A machine tool according to claim 1, further comprising a number of suction cups engagable with a side of the work piece and adjustably attached to the support grate as a work piece clamping means.

12. A machine tool according to claim 11 further characterized in that the support grate defines a precise planar support surface for workpieces, and the suction cups are disposed at positions with the support grate and relative to the support surface so as to clamp and hold the workpieces firmly against the planar support surface.

* * * * *